No. 704,021. Patented July 8, 1902.
A. A. FREEMAN.
AUTOMATIC LUBRICATOR.
(Application filed Aug. 26, 1901.)
(No Model.)
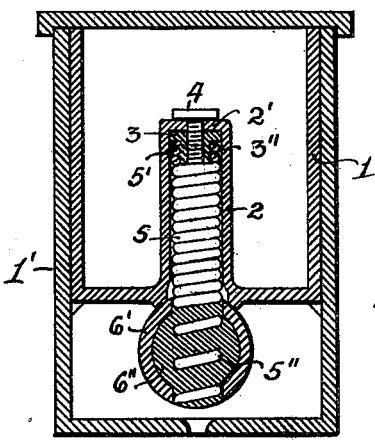
FIG. 1
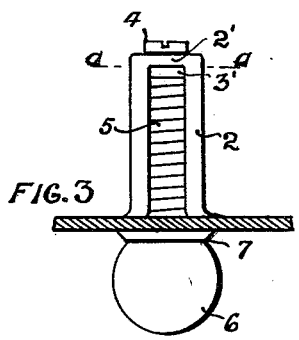
FIG. 3
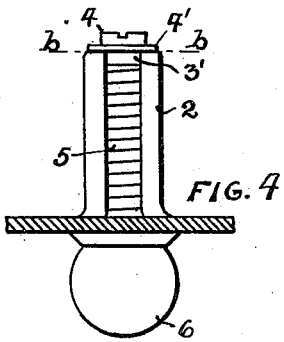
FIG. 4
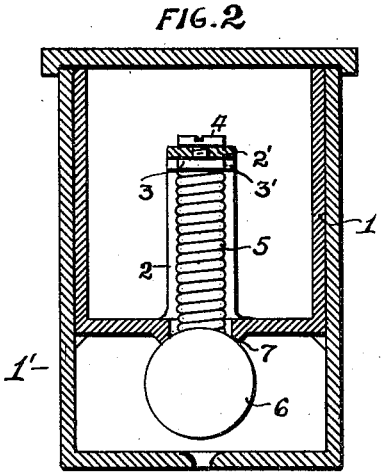
FIG. 2
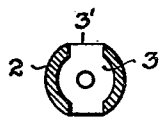
FIG. 5
FIG. 6
WITNESSES:
Percival H. Granger.
Grace R. Rau.
INVENTOR
Albert A. Freeman
BY
Charles N. Butler
ATTORNEY ated Auto
UNITED STATES PATENT OFFICE.

ALBERT A. FREEMAN, OF PHILADELPHIA, PENNSYLVANIA, ASSIGNOR TO STANDARD AUTOMATIC LUBRICATOR COMPANY, OF PHILADELPHIA, PENNSYLVANIA, A CORPORATION OF NEW JERSEY.

AUTOMATIC LUBRICATOR.

SPECIFICATION forming part of Letters Patent No. 704,021, dated July 8, 1902.

Application filed August 26, 1901. Serial No. 73,255. (No model.)

*To all whom it may concern:*

Be it known that I, ALBERT A. FREEMAN, a citizen of the United States, residing at Philadelphia, in the county of Philadelphia, State of Pennsylvania, have invented certain Improvements in Automatic Lubricators, of which the following is a specification.

This invention relates to automatic lubricators, in which a depending spring holds an inverted ball-valve up against its seat, controlling the port leading from the reservoir, so that the rate at which the lubricant is fed depends upon the tension of the spring and the vibration to which the ball is subjected.

The regular feeding of the lubricant at the rate required for perfect lubrication without waste I have found to be most satisfactorily effected by the use of a nicely-tempered spring having its coils closed, so that it forms a flexible column with a solid wall, in combination with a weighted or loaded ball-valve immovably fixed thereto. The solid column formed of closed coils prevents appreciable contraction from its normal state, but permits the elongation necessary for varying the pressure of the valve upon its seat, so that the lubricant in the reservoir may work through the port at the rate required for effecting the lubrication desired. The loaded ball-valve, having a core in which opened coils of the spring are embedded, provides sufficient weight to effect the requisite elongation of the column for permitting the regular feeding of the lubricant when the ball is subjected to the vibration of the mechanism due to motion. The peculiar fixed connection between the column and the valve prevents the wear or play which takes place in a movable connection and results in irregular or wasteful lubrication, while the peculiar support employed for sustaining the column provides against its irregular or other action than the slight longitudinal vibration requisite for sufficiently moving the valve to effect the desired feeding of the lubricant.

The characteristic features of my invention will more fully appear by reference to the accompanying drawings in illustration thereof, of which—

Figure 1 is a vertical sectional view. Fig. 2 is a vertical sectional view at right angles to that shown in Fig. 1. Fig. 3 is a side elevation of the valve mechanism and its support. Fig. 4 is a side elevation of the valve mechanism and a modified form of support therefor. Fig. 5 is a sectional view on the line $a\ a$ of Fig. 3, and Fig. 6 is a sectional view on the line $b\ b$ of Fig. 4.

Referring to the drawings, the reservoir 1, which may be adapted for fitting any usual form of lubricator-box, as 1', contains the struts 2, forming an open pedestal, which may have a bearing 2' at the top thereof, this pedestal acting as a support and guide for the valve-controlling mechanism. A head 3, having shoulders 3', which engage the struts and prevent the head from turning, is provided with a shank 3'', internally threaded for the engagement of the screw 4, which holds the head, and externally threaded for engaging the coils 5' at the top of the column 5, which is supported thereby. The head of the screw 4 may rest upon the bearing 2' or directly upon the struts 2, in which latter case a bearing 4' may be provided on the head. The column 5 has the opened coils 5'' at its lower end inserted in the spherical shell 6' of the valve 6, the column and shell being permanently fixed together and the valve weighted by means of the core of heavy metal 6'', which fills the shell and the opened coil embedded therein. The shell 6' is suitably formed of a hard metal, such as cast-iron, which can be turned so as to form a perfect union with the port-seat 7 before connecting it with the column 5. The core 6'' is suitably formed of Babbitt metal, which will cool and solidify without affecting the temper of the column, will not shrink away from the shell in cooling, so as to permit leakage through the ball, and provides the weight requisite for most satisfactory results.

Having described my invention, I claim—

1. In an automatic lubricator, a valve comprising a shell and a core cast therein, in combination with a spring having coils thereof embedded in said core, substantially as specified.

2. In an automatic lubricator, a valve comprising a spherical shell and a core of loading material cast therein, in combination with a spring having open coils embedded in said core and closed coils forming a flexible supporting-column, substantially as specified.

3. In an automatic lubricator, a reservoir, an open pedestal therein, a head having shoulders for holding the same against turning by engagement with said pedestal, a coiled spring supported by said head, said head having a threaded shank which engages the coils of said spring, and a valve permanently fixed to said spring and supported thereby, said valve comprising a shell and a core in which the end of said spring is embedded, substantially as specified.

4. In an automatic lubricator, a reservoir, guiding-struts therein, a head having shoulders for holding the same longitudinally and against turning, a coiled spring forming a closed column supported by said head, and a valve comprising a spherical shell having a core of loading material cast therein, the lower coils of said spring being embedded in said core, substantially as specified.

In testimony whereof I have signed my name to this specification, in the presence of the two subscribing witnesses, this 23d day of August, A. D. 1901.

ALBERT A. FREEMAN.

Witnesses:
LAURA V. WHITCOMB,
PERCIVAL H. GRANGER.